US012629832B2

(12) United States Patent
    Itagaki et al.

(10) Patent No.: US 12,629,832 B2
(45) Date of Patent: May 19, 2026

(54) ROBOT CONTROL DEVICE

(71) Applicant: FANUC CORPORATION, Yamanashi (JP)

(72) Inventors: Taketo Itagaki, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 260 days.

(21) Appl. No.: 18/018,199

(22) PCT Filed: Aug. 18, 2021

(86) PCT No.: PCT/JP2021/030148
    § 371 (c)(1),
    (2) Date: Jan. 26, 2023

(87) PCT Pub. No.: WO2022/044906
    PCT Pub. Date: Mar. 3, 2022

(65) Prior Publication Data
    US 2023/0278216 A1      Sep. 7, 2023

(30) Foreign Application Priority Data
    Aug. 25, 2020    (JP) ................................. 2020-141599

(51) Int. Cl.
    B25J 9/16              (2006.01)
(52) U.S. Cl.
    CPC ................................... B25J 9/1666 (2013.01)
(58) Field of Classification Search
    CPC ...... B25J 9/1666; B25J 9/1674; B25J 9/1653;
                B25J 19/06; B25J 9/1602; B25J 9/1628;
    (Continued)

(56) References Cited

U.S. PATENT DOCUMENTS 5,710,870 A * 1/1998 Ohm ........................ B25J 19/02
                                                              700/262
2005/0055134 A1    3/2005 Okuda et al.
                    (Continued)

FOREIGN PATENT DOCUMENTS

CN        104044137        9/2014
CN        108073816        5/2018
                    (Continued)

OTHER PUBLICATIONS

International Search Report issued Nov. 2, 2021 in corresponding International Application No. PCT/JP2021/030148.

*Primary Examiner* — Esvinder Singh
(74) *Attorney, Agent, or Firm* — Wenderoth, Lind & Ponack, L.L.P.

(57)                ABSTRACT

The purpose of the present invention is to provide a robot control device capable of efficiently adjusting a parameter. This robot control device comprises: a first application unit that applies a setting parameter to a first safety parameter for verification in a verification mode; a first update unit that updates, on the basis of the first safety parameter, first safety information related to the robot in a verification function in the verification mode; a copy unit that copies the setting parameter; a second application unit that, after switching from the verification mode to the safety mode by a switch unit, applies the setting parameter copied by the copy unit to a second safety parameter; and a second update unit that updates, on the basis of the second safety parameter, second safety information related to the robot in a safety function in the safety mode.

10 Claims, 6 Drawing Sheets

(58) Field of Classification Search
CPC ........ B25J 9/163; B25J 9/1656; B25J 9/1664;
B25J 9/1676; G05B 2219/23054; G05B
2219/23082; G05B 2219/23401; G05B
2219/25065; G05B 2219/33037; G05B
2219/36252; G05B 2219/49065
See application file for complete search history.

(56)     References Cited

U.S. PATENT DOCUMENTS

| | | | |
|---|---|---|---|
| 2015/0273690 A1* | 10/2015 | Kotera | B25J 9/1656 |
| | | | 901/3 |
| 2015/0343636 A1* | 12/2015 | Toda | G05B 19/414 |
| | | | 318/568.11 |
| 2018/0036884 A1* | 2/2018 | Chen | B25J 9/1676 |
| 2018/0207801 A1* | 7/2018 | Oyama | B25J 9/1676 |
| 2019/0000585 A1* | 1/2019 | Kokubo | A61B 1/00009 |
| 2023/0040040 A1* | 2/2023 | Ennsbrunner | B25J 9/1676 |

FOREIGN PATENT DOCUMENTS

| | | |
|---|---|---|
| CN | 108563146 | 9/2018 |
| JP | 7-129214 | 5/1995 |
| JP | 2002-236668 | 8/2002 |
| JP | 2005-81445 | 3/2005 |
| JP | 2005-103740 | 4/2005 |
| JP | 2015-188954 | 11/2015 |
| JP | 2015-223678 | 12/2015 |
| KR | 10-2012-0098629 | 9/2012 |
| WO | 2019/240051 | 12/2019 |

* cited by examiner

FIG. 5

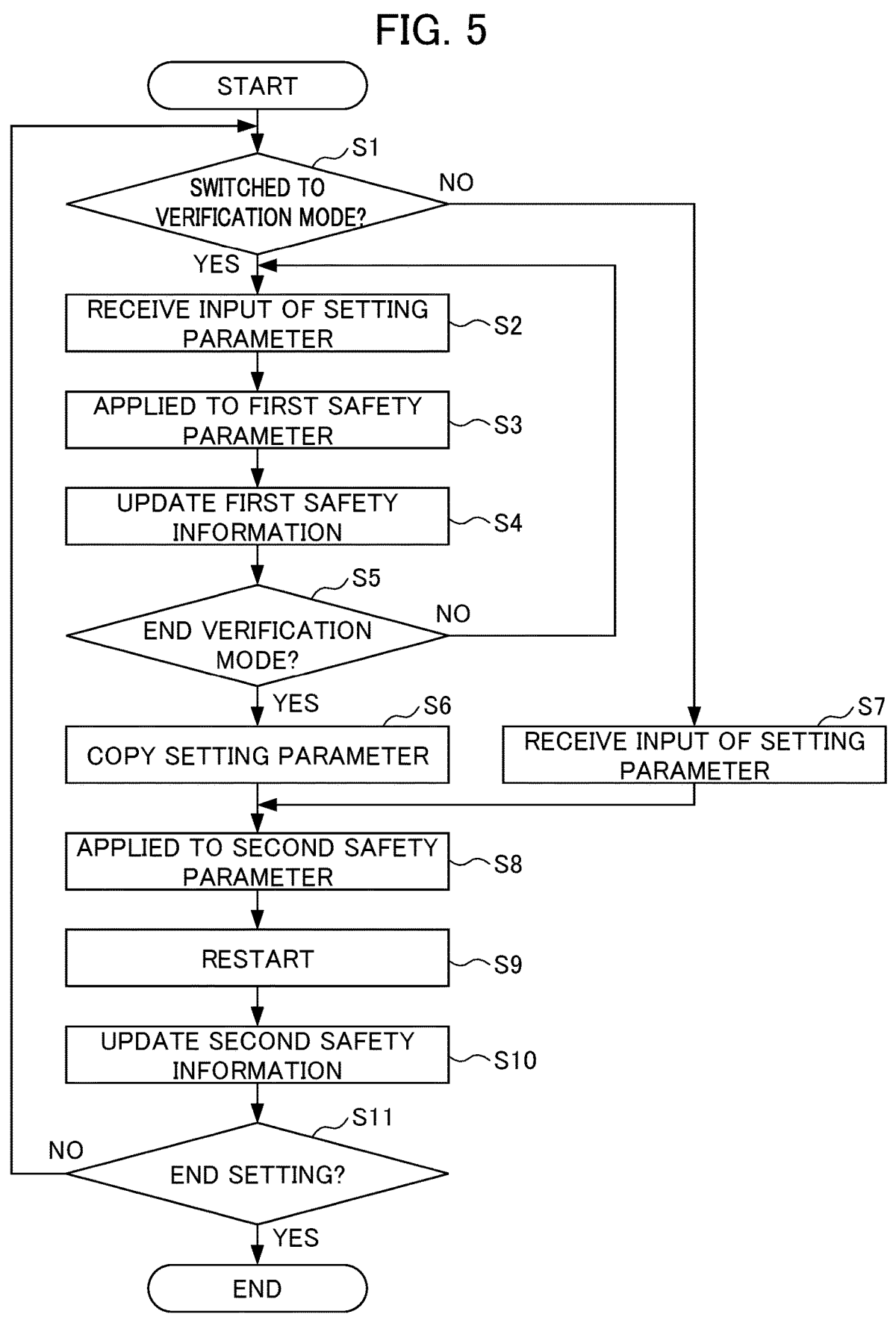

START

S1
SWITCHED TO VERIFICATION MODE? —— NO

YES

RECEIVE INPUT OF SETTING PARAMETER — S2

APPLIED TO FIRST SAFETY PARAMETER — S3

UPDATE FIRST SAFETY INFORMATION — S4

S5
END VERIFICATION MODE? —— NO

YES

COPY SETTING PARAMETER — S6

RECEIVE INPUT OF SETTING PARAMETER — S7

APPLIED TO SECOND SAFETY PARAMETER — S8

RESTART — S9

UPDATE SECOND SAFETY INFORMATION — S10

S11
END SETTING? —— NO

YES

END

ROBOT CONTROL DEVICE

TECHNICAL FIELD

The present disclosure relates to a robot control device.

BACKGROUND ART

Conventionally, robot control devices have been proposed which respectively limit the operation of a robot until a predetermined safety condition is satisfied based on a signal from a detector that detects the presence or absence of an obstacle within an operation range of the robot, safety devices such as an emergency stop switch, or other devices (for example, refer to Japanese Unexamined Patent Application, Publication No. 2015-223678).

Patent Document 1: Japanese Unexamined Patent Application, Publication No. 2015-223678

DISCLOSURE OF THE INVENTION

Problems to be Solved by the Invention

Such robot control devices each include a safety function (for example, a dual-safe check function) in which two CPUs mutually check input-output signals.

However, in such a safety function, in a case of changing the limit of the operating area of the robot, if one parameter is changed, it is necessary to input a password, and the operation of adjusting the parameter becomes cumbersome. In addition, the adjustment of parameters such as the coordinates of the vertex of the operating region of the robot and the speed limit of the robot often involves trial and error, and the number of times of changing the parameters is large. Therefore, the number of times of password input increases, and the operation of adjusting the parameters becomes troublesome.

Therefore, it has been desired to efficiently adjust parameters in the robot control devices.

Means for Solving the Problems

A robot control device according to an embodiment of the present disclosure includes: a function control unit that controls a safety function for performing an operation of a robot safely and a verification function for verifying a setting of the safety function; a switching unit that switches between a safety mode for executing the safety function and a verification mode for executing the verification function; a receiving unit that receives an input of a setting parameter in the verification mode; a first applying unit that applies the setting parameter to a first safety parameter for verification in the verification mode; a first updating unit that updates first safety information relating to the robot in the verification function based on the first safety parameter in the verification mode; a copying unit that copies the setting parameter; a second applying unit that applies the setting parameter copied by the copying unit to a second safety parameter after the switching unit switches from the verification mode to the safety mode; and a second updating unit that updates second safety information relating to the robot in the safety function based on the second safety parameter in the safety mode.

Effects of the Invention

According to the present disclosure, it is possible to adjust parameters efficiently.

BRIEF DESCRIPTION OF THE DRAWINGS

FIG. 5 is a flowchart showing a flow of processing of a robot control device according to the present embodiment.

PREFERRED MODE FOR CARRYING OUT THE INVENTION

Figure 1:
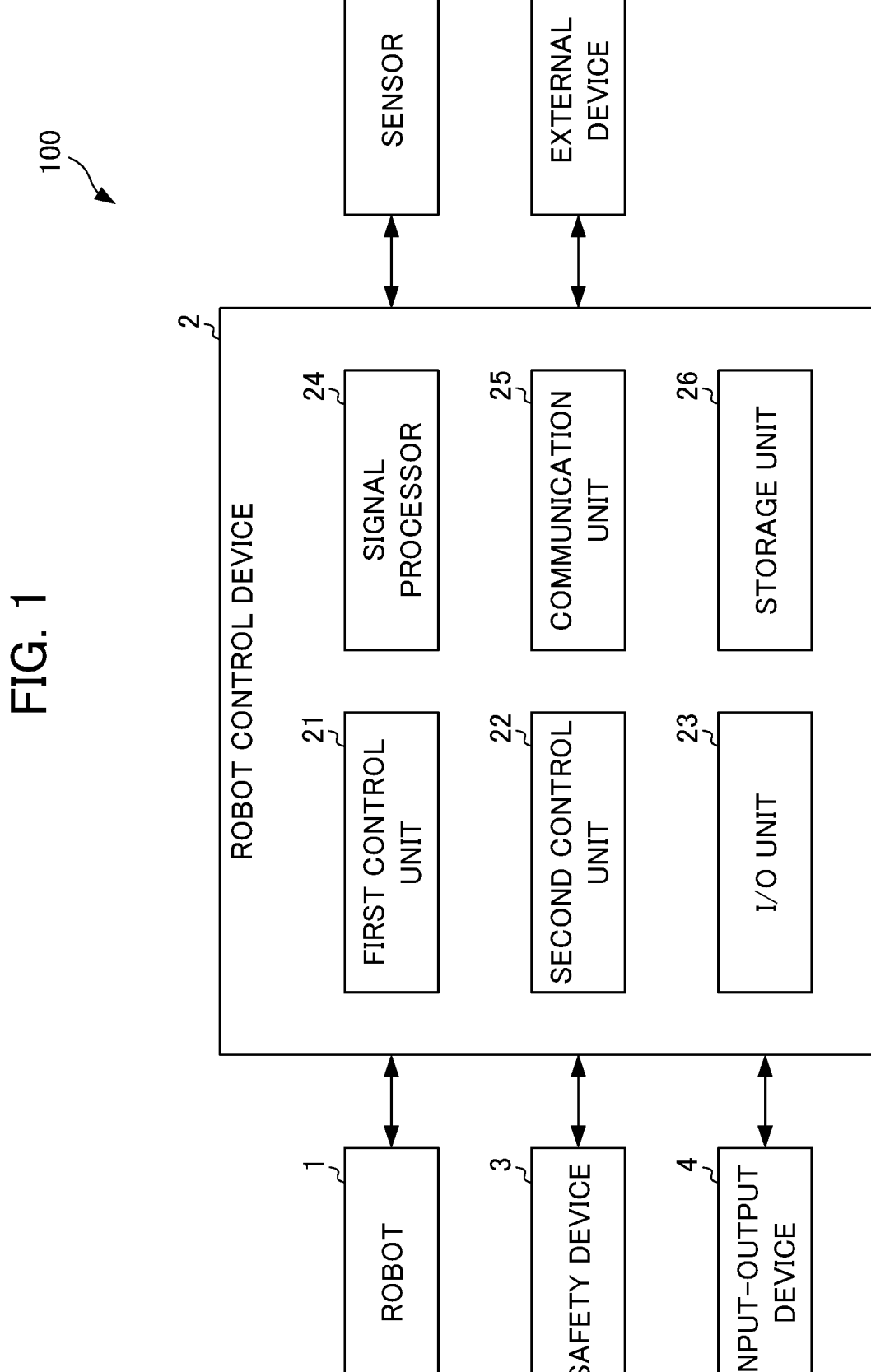
FIG. 1 is a diagram showing an outline of a robot system according to an embodiment of the present disclosure.

Hereinafter, an example of an embodiment of the present disclosure will be described. FIG. 1 is a diagram showing an outline of a robot system 100 according to the present embodiment. As shown in FIG. 1, the robot system 100 includes a robot 1, a robot control device 2, a safety device 3, an input-output device 4, a sensor 5, and an external device 6.

The robot 1 is an industrial robot having an arbitrary structure. The robot 1 may be, for example, a six-axis articulated robot. The robot control device 2 controls the robot 1 to cause the robot 1 to perform a predetermined operation or the like.

The safety device 3 includes a detector that detects the presence or absence of an obstacle within the operating range of the robot 1, an emergency stop switch, an encoder attached to a motor of the robot 1, and other components. The input-output device 4 includes a switch connected to the robot control device 2, a teaching control panel called a teach pendant, and the like. The input-output device 4 receives various signals from the robot control device 2 or outputs various signals to the robot control device 2.

The sensor 5 includes a visual sensor (for example, a camera), a force sensor, and the like, and outputs detected signals to the robot control device 2. The external device 6 is a variety of devices connected to the robot control device, and includes, for example, a server and other robot control devices.

The robot control device 2 includes a first control unit 21, a second control unit 22, an I/O unit 23, a signal processing unit 24, a communication unit 25, and a storage unit 26.

The first control unit 21 is a processor such as a CPU (Central Processing Unit). The first control unit 21 executes programs stored in the storage unit 26 to perform various processes related to drive control of the robot 1 (for example, a servo motor). Furthermore, based on a signal from the safety device 3, the first control unit 21 limits the operation of the robot 1 until a predetermined safety condition is satisfied. The first control unit 21 has a dual check safety function for mutual checking of input-output signals with the second control unit 22.

The second control unit 22 is a processor such as a CPU. The second control unit 22 limits the operation of the robot 1 until a predetermined safety condition is satisfied based on a signal from the safety device 3. The second control unit 22 has a dual check safety function for mutual checking of input-output signals with the first control unit 21.

The I/O unit 23 includes, for example, an I/O port, and inputs and outputs a signal from the input-output device 4 connected to the robot control device 2 to and from the first control unit 21 and the second control unit 22.

The signal processing unit 24 performs various kinds of processing (for example, image processing) on a signal from the sensor 5. The communication unit 25 communicates with the external device 6 via Ethernet (registered trademark), a field bus, or the like.

Figure 2:
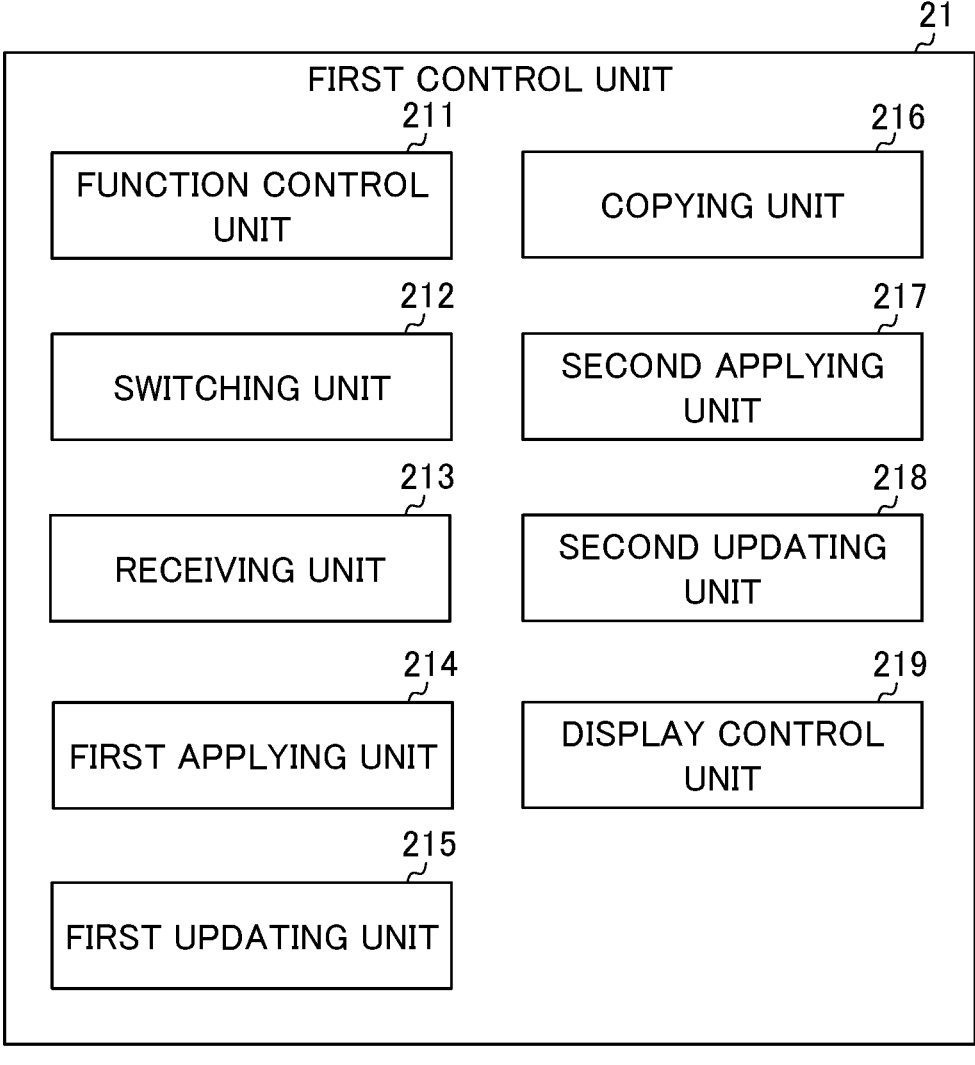
FIG. 2 is a diagram showing a configuration of a first control unit according to the present embodiment.

FIG. 2 is a diagram showing a configuration of the first control unit 21 according to the present embodiment. As shown in FIG. 2, the first control unit 21 includes a function control unit 211, a switching unit 212, a receiving unit 213, a first applying unit 214, a first updating unit 215, a copying unit 216, a second applying unit 217, a second updating unit 218, and a display control unit 219.

The function control unit 211 controls a safety function for safely performing the operation of the robot and a verification function for verifying the setting of the safety function.

Specifically, the function control unit 211 controls safety function software for safely performing the operation of the robot 1 and verification function software for verifying the setting of the safety function software.

In the present embodiment, an example of the safety function software including the safety function and the verification function software including the verification function will be described. However, the safety function and the verification function are not limited to individually separate pieces of software, but may be implemented as a piece of software having separate functions, for example.

The switching unit 212 switches a safety mode for executing the safety function software and a verification mode for executing the verification function software. Specifically, the switching unit 212 switches between the safety mode and the verification mode in accordance with an input operation by the input-output device 4.

The receiving unit 213 receives an input of a setting parameter by the input-output device 4 in the verification mode. Here, the input-output device 4 may input a numerical value to the setting parameter, and the setting parameter may be changed by dragging and dropping the coordinates of the vertex of the region displayed on the input-output device 4.

The first applying unit 214 applies the setting parameter to the first safety parameter for verification in the verification mode. By thus applying the setting parameter to the first safety parameter, the verification function software can change the first safety parameter using the setting parameter and perform verification using the changed first safety parameter.

Furthermore, the first applying unit 214 does not need to input a password when applying the setting parameter to the first safety parameter. Usually, the change of the first safety parameter often involves trial and error in order to find the optimal first safety parameter, and the number of times of parameter change is large. Therefore, the number of times of password input increases, and the operation of adjusting the parameter becomes troublesome.

Since the verification function software according to the present embodiment applies the setting parameter to the first safety parameter without requiring the input of the password, it is possible to perform the verification using the first safety parameter efficiently.

In the verification mode, the first updating unit 215 updates the first safety information relating to the position and speed of the robot 1 in the verification function based on the first safety parameter. Here, the first safety information includes information relating to a position and a speed of the robot 1, such as an operation region of the robot 1, a limit speed of the robot 1, and the like. For example, the first safety information is used in the verification mode and is not used in the safety mode.

When the verification function software ends, the copying unit 216 copies the setting parameters used in the verification function software. Then, the copying unit 216 provides the copied setting parameters to the second applying unit 217.

After switching from the verification mode to the safety mode by the switching unit 212, the second applying unit 217 applies the setting parameter copied by the copying unit 216 to the second safety parameter.

The second applying unit 217 requires the input of a password when applying the setting parameter to the second safety parameter. By requiring the input of the password in this way, it is possible for the safety function software to securely apply the second safety parameter which may affect the safety of the robot 1.

In the safety mode, the second updating unit 218 updates the second safety information on the position and speed of the robot 1 in the safety function software based on the second safety parameter. Here, the second safety information includes information relating to a position and a speed of the robot 1, such as an operation region of the robot 1, a limit speed of the robot 1, and the like. For example, the second safety information is used in the safety mode and is not used in the verification mode.

The display control unit 219 displays a screen for setting the safety function software and the verification function software on, for example, a display unit (for example, a display unit of a teach pendant) of the input-output device 4. Specifically, the display control unit 219 displays, on the display unit of the input-output device 4, a screen for inputting a numerical value of a setting parameter by the input-output device 4, and a screen for designating an area of the setting parameter.

When the verification function software having no safety function is valid in the automatic mode, since the robot control device 2 allows a malfunction of the robot due to a failure or the like at the time of automatic driving, there is a possibility that the malfunction of the robot causes a hazard to the user. When the verification function software is valid in the automatic mode in which the robot 1 is automatically operated, the function control unit 211 stops the start of the automatic operation of the robot 1. Thus, the robot control device 2 can safely execute the operation of the verification function software.

The safety function software and the verification function software also include functions for checking position and speed. Specifically, the safety function software and the verification function software include a function for checking the position of each axis of the robot 1, the speed of each axis of the robot 1, the Cartesian position of the robot 1, and the Cartesian speed of the robot 1.

Figure 3:
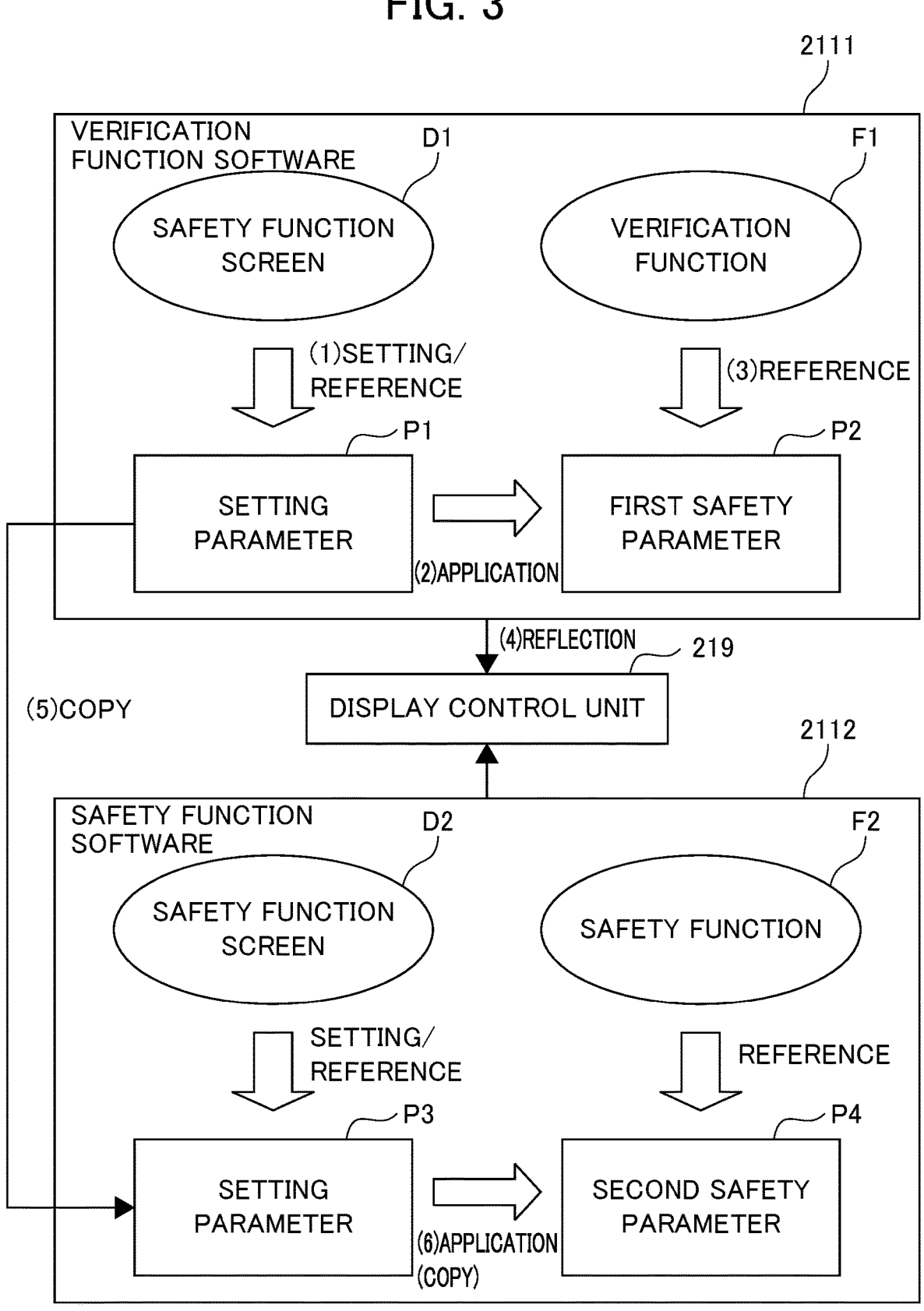
FIG. 3 is a diagram showing operation examples of safety function software and verification function software.

FIG. 3 is a diagram showing operation examples of the safety function software and the verification function software. As shown in FIG. 3, when the switching unit 212 switches from the safety mode to the verification mode, the function control unit 211 starts the verification function software 2111.

The receiving unit 213 receives an input of a setting parameter P1 by the input-output device 4 on the safety function screen D1 displayed on the input-output device 4. Then, the first applying unit 214 sets and refers to the received setting parameter P1 (refer to (1) setting/reference in FIG. 3).

Next, the first applying unit 214 applies the setting parameter P1 to a first safety parameter P2 for verification in the verification mode (refer to (2) application in FIG. 3). Next, the first updating unit 215 refers to the first safety parameter P2 (refer to (3) reference of FIG. 3) and updates the first safety information relating to the position and speed of the robot 1 in the verification function F1 based on the first safety parameter P2.

The display control unit 219 reflects the updated first safety information on a screen for setting the verification function software 2111. Then, the display control unit 219 displays a screen for setting the verification function software 2111 on the display unit (for example, the display unit of the teach pendant) of the input-output device 4 (refer to (4) reflection in FIG. 3).

Next, the copying unit 216 copies the setting parameter P1 used in the verification function software 2111. Then, the copying unit 216 supplies the copied setting parameter P3 to the second applying unit 217 (refer to (5) copy in FIG. 3).

Next, when the switching unit 212 switches from the verification mode to the safety mode, the function control unit 211 activates the safety function software 2112. The second applying unit 217 sets and refers to the copied setting parameter P3.

Then, the second applying unit 217 applies the setting parameter P3 copied by the copying unit 216 to the second safety parameter P4 (refer to (6) application in FIG. 3). Next, the second updating unit 218 updates the second safety information relating to the position and speed of the robot 1 in the safety function F2 based on the applied second safety parameter P4.

The display control unit 219 reflects the updated second safety information on a screen for setting the safety function software 2112. Then, the display control unit 219 displays a screen for setting the safety function software 2112 on a display unit (for example, a display unit of a teach pendant) of the input-output device 4.

Figure 4A:
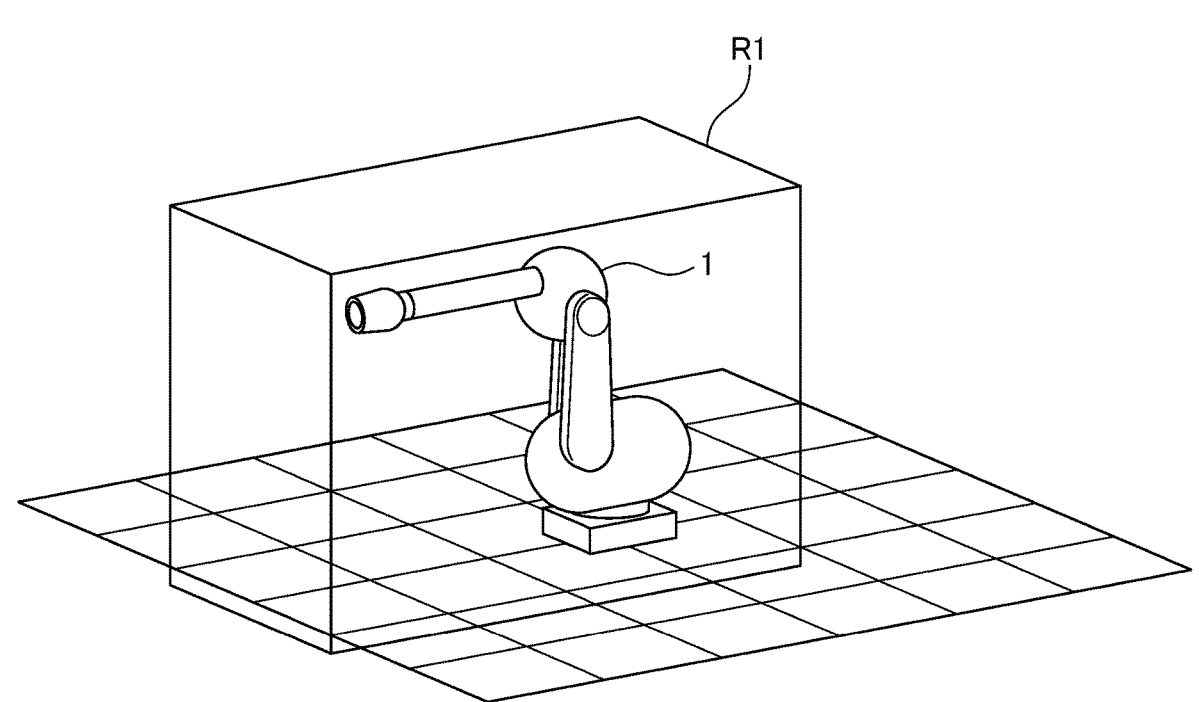
FIG. 4A is a diagram showing a specific example of updating first safety information and second safety information.
Figure 4B:
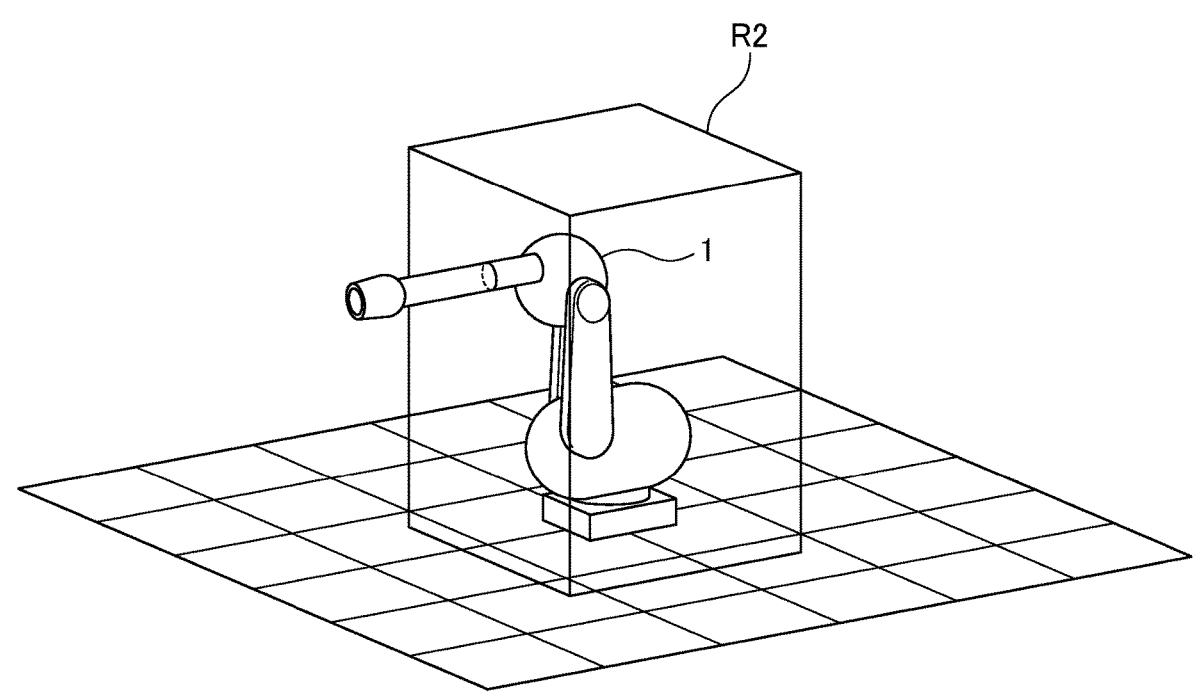
FIG. 4B is a diagram showing a specific example of updating the first safety information and the second safety information.

FIGS. 4A and 4B are diagrams, each showing a specific example of updating the first safety information or the second safety information. FIG. 4A shows an operation region R1 of the robot 1 as the first safety information or the second safety information before updating. That is, the robot 1 can operate in the operation region R1.

The first updating unit 215 updates the first safety information based on the first safety parameter in the verification mode, or the second updating unit 218 updates the second safety information based on the second safety parameter in the safety mode.

FIG. 4B shows an operation region R2 of the robot 1 as the updated first safety information or second safety information. That is, the robot 1 can operate in the operation region R2. By updating the first safety information or the second safety information in this manner, it is possible for the robot control device 2 to change the operation region of the robot 1 from the operation region R1 to the operation region R2.

FIG. 5 is a flowchart showing the flow of processing of the robot control device 2 according to the present embodiment. In Step S1, the function control unit 211 determines whether or not the safety mode has been switched to the verification mode by the switching unit 212. When the mode has been switched to the verification mode (YES), the processing proceeds to Step S2. When the mode has not been switched to the verification mode, that is, when the mode is the safety mode (NO), the processing proceeds to Step S7.

In Step S2, the receiving unit 213 receives an input of a setting parameter by the input-output device 4 in the verification mode. In Step S3, the first applying unit 214 applies the setting parameter to the first safety parameter for verification in the verification mode.

In Step S4, the first updating unit 215 updates the first safety information relating to the position and speed of the robot 1 in the verification function based on the first safety parameter in the verification mode.

In Step S5, the function control unit 211 determines whether or not to end the verification mode. When the verification mode is ended (YES), the processing proceeds to Step S6. When the verification mode is not ended (NO), the processing returns to Step S2.

In Step S6, when the verification function software ends, the copying unit 216 copies the setting parameter used in the verification function software. In Step S7, the receiving unit 213 receives an input of the setting parameter by the input-output device 4 in the safety mode.

In Step S8, the second applying unit 217 applies the setting parameter copied by the copying unit 216 in Step S6 or the setting parameter received by the receiving unit 213 in Step S7 to the second safety parameter. Furthermore, the second applying unit 217 requires the input of a password by the input-output device 4 when applying the setting parameter to the second safety parameter.

In Step S9, after applying the setting parameter to the second safety parameter, the first control unit 21 restarts the robot control device 2. This allows the safety function software to enable the applied second safety parameter.

In Step S10, the second updating unit 218 updates the second safety information relating to the position and speed of the robot 1 in the safety function software based on the second safety parameter in the safety mode.

In Step S11, the function control unit 211 determines whether or not to end the setting of the safety function software and the verification function software. When the setting is ended (YES), the function control unit 211 ends the setting of the safety function software and the verification function software. When the setting is not ended (NO), the processing returns to Step S1.

As described above, the robot control device 2 according to an embodiment to the present disclosure includes: the function control unit 211 that controls a safety function for performing an operation of the robot 1 safely and a verification function for verifying a setting of the safety function; the switching unit 212 that switches between a safety mode for executing the safety function and a verification mode for executing the verification function; the receiving unit 213 that receives an input of a setting parameter in the verification mode; the first applying unit 214 that applies the setting parameter to a first safety parameter for verification in the verification mode; the first updating unit 215 that updates first safety information relating to position and speed of the robot 1 in the verification function based on the first safety parameter in the verification mode; the copying unit 216 that copies the setting parameter; the second applying unit 217 that applies the setting parameter copied by the copying unit 216 to a second safety parameter after the switching unit 212 switches from the verification mode to the safety mode; and the second updating unit 218 that updates second safety information relating to position and speed of the robot 1 in the safety function based on the second safety parameter in the safety mode.

As a result, the robot control device 2 performs verification using the setting parameter in the verification mode, copies the verified setting parameters, and applies the copied setting parameters in the safety mode. With such a configuration, it is possible for the robot control device 2 to apply, in the safety mode, the setting parameter verified in the verification mode, whereby it is possible to efficiently adjust the parameters.

Furthermore, the first applying unit 214 does not require an input of a password when the setting parameter is applied to the first safety parameter, and the second applying unit 217 requires an input of a password when the setting parameter is applied to the second safety parameter.

As a result, the robot control device 2 applies the setting parameter to the first safety parameter without requiring the input of the password in the verification function software, whereby it is possible to perform the verification using the first safety parameter efficiently. Furthermore, by requiring the input of the password, it is possible for the safety function software to safely apply the second safety parameter which may affect the safety of the robot 1.

Furthermore, the robot control device 2 further includes the display control unit 219 that displays a screen for setting the safety function and the verification function on the display unit of the input-output device 4. With such a configuration, it is possible for the operator using the robot control device 2 to appropriately set the safety function and the verification function.

Furthermore, in a case in which the verification function having no safety function is valid in the automatic mode in which the robot 1 is automatically operated, the function control unit 211 stops the start of the automatic operation of the robot 1. With such a configuration, it is possible for the robot control device 2 to prevent a malfunction of the robot due to a failure or the like at the time of automatic driving, and prevent endangering of the user.

The safety function and the verification function include a function for checking the position of each axis of the robot 1, the speed of each axis of the robot 1, the Cartesian position of the robot 1, and the Cartesian speed of the robot 1. With such a configuration, it is possible for the robot control device 2 to monitor the position and speed of the robot 1. Furthermore, it is possible for the robot control device 2 to shut off power to a drive circuit of the robot 1 when the robot 1 is in a non-safe state by satisfying the set conditions or when the speed exceeds the limit speed.

Although an embodiment of the present disclosure has been described above, the robot control device 2 can be implemented by hardware, software, or a combination thereof. Furthermore, the control method performed by the robot control device 2 can also be implemented by hardware, software, or a combination of these. Here, implementation by software means that it is realized by a computer reading and executing programs.

The programs may be stored using various types of non-transitory computer-readable media (non-transitory computer readable medium) and provided to a computer. Non-transitory computer-readable media includes various types of tangible storage media. Examples of non-transitory computer-readable media include a magnetic recording medium (e.g., a hard disk drive), a magneto-optical recording medium (e.g., a magneto-optical disk), CD-ROM (Read Only Memory), CD-R, CD-R/W, semiconductor memory (For example, mask ROM, PROM (Programmable ROM), EPROM (Erasable PROM), flash ROM, and RAM (random access memory).

Although the above-described embodiment is a preferred embodiment of the present disclosure, the scope of the present disclosure is not limited to the above-described embodiment. Various modifications can be made without departing from the gist of the present disclosure. For example, the first safety information may include information other than the position and speed of the robot. Furthermore, the second applying unit 217 may use a release key other than a password.

EXPLANATION OF REFERENCE NUMERALS

1 robot
2 robot control device
3 safety device
4 input-output device
5 sensor
6 external device
21: first control unit
22 second control unit
23 i/o unit
24 signal processing unit
25 communication unit
26 storage unit
211: function control unit
212 switching unit
213 receiving unit
214 first applying unit
215 first updating unit
216 copying unit
217 second applying unit
218 second updating unit
219: display control unit

The invention claimed is:

1. A robot control device comprising:
processors,
wherein the processors are configured to:
control a safety function for performing an operation of a robot safely and a verification function for verifying a setting of the safety function;
switch between a safety mode for executing the safety function and a verification mode for executing the verification function;
receive an input of a setting parameter by a user in the verification mode;
apply the setting parameter to a first safety parameter for verification in the verification mode;
update first safety information relating to the robot in the verification function based on the first safety parameter in the verification mode, wherein the setting parameter is automatically verified by the verification function by comparing it to a first safety parameter prior to changing;
copy the setting parameter after it has been verified in the verification mode;
apply the setting parameter to a second safety parameter after switching from the verification mode to the safety mode;
update second safety information relating to the robot in the safety function based on the second safety parameter in the safety mode;
change an operation region of the robot by updating the first safety information or the second safety information;

not require a user authentication when the setting parameter is applied to the first safety parameter, and require the user authentication when the setting parameter is applied to the second safety parameter, wherein the processors include a first processor and a second processor, and wherein the first processor and the second processor are configured to mutual check input-output signals in the safety function.

2. The robot control device according to claim 1, wherein the processor displays a screen for setting the safety function and the verification function on a display.

3. The robot control device according to claim 2, wherein the processor reflects the updated the first safety information and the second safety information on the screen for setting the safety function and the verification function.

4. The robot control device according to claim 1, wherein, in a case in which the verification function is valid in an automatic mode in which the robot is automatically operated, the processor stops starting of an automatic operation of the robot.

5. The robot control device according to claim 1, wherein the safety function and the verification function include functions for checking position and speed of the robot.

6. The robot control device according to claim 5, wherein the safety function and the verification function include a function for checking the position of each axis of the robot, the speed of each axis of the robot, a Cartesian position of the robot, and a Cartesian speed of the robot.

7. The robot control device according to claim 1, wherein the user authentication includes inputting of a password.

8. The robot control device according to claim 1, wherein the robot is an articulated industrial robot.

9. The robot control device according to claim 1, wherein the processor starts the verification function, when switching from the safety mode to the verification mode.

10. A robot control device comprising:

a processor, wherein the processor is configured to:

control a safety function for performing an operation of a robot safely and a verification function for verifying a setting of the safety function;

switch between a safety mode for executing the safety function and a verification mode for executing the verification function;

receive an input of a setting parameter by a user in the verification mode;

apply the setting parameter to a first safety parameter for verification in the verification mode, wherein the setting parameter is automatically verified by the verification function by comparing it to a first safety parameter prior to changing;

update first safety information relating to the robot in the verification function based on the first safety parameter in the verification mode;

copy the setting parameter after it has been verified in the verification mode;

apply the setting parameter to a second safety parameter after switching from the verification mode to the safety mode;

update second safety information relating to the robot in the safety function based on the second safety parameter in the safety mode;

change an operation region of the robot by updating the first safety information or the second safety information;

not require a user authentication when the setting parameter is applied to the first safety parameter, and require the user authentication when the setting parameter is applied to the second safety parameter, wherein the safety function and the verification function include functions for checking position and speed of the robot set by the first safety information and the second safety information, in at least the operation region of the robot.

* * * * *